United States Patent [19]

Lerner

[11] 4,400,362

[45] Aug. 23, 1983

[54] REMOVAL OF NITROGEN OXIDES FROM GAS

[76] Inventor: Bernard J. Lerner, 727 Orchard Hill Dr., Pittsburgh, Pa. 15238

[21] Appl. No.: 317,948

[22] Filed: Nov. 4, 1981

[51] Int. Cl.$^3$ .................. C01B 21/00; C01B 21/20; C01B 21/48; C01C 1/18

[52] U.S. Cl. .................. 423/235; 423/385; 423/395; 423/396; 423/523; 436/163

[58] Field of Search ............... 423/235, 385, 523, 524, 423/395, 396, 400, 521; 436/151, 163

[56] References Cited

U.S. PATENT DOCUMENTS

| | | | |
|---|---|---|---|
| 1,889,973 | 12/1932 | Miller | 423/524 |
| 1,978,431 | 10/1934 | Kirst et al. | 423/385 |
| 3,045,540 | 8/1977 | Hertzog | 423/385 |
| 3,329,478 | 7/1967 | Garlet | 23/2 |
| 3,348,914 | 10/1967 | Quanquin et al. | 23/161 |
| 3,880,618 | 4/1975 | McCrea et al. | 55/68 |
| 3,920,421 | 11/1975 | Collin | 55/73 |
| 4,073,862 | 2/1978 | Haese | 423/238 |
| 4,081,509 | 3/1978 | Hishihuma et al. | 423/235 |
| 4,087,372 | 5/1978 | Saitoh et al. | 252/184 |
| 4,164,546 | 8/1979 | Welty | 423/239 |
| 4,167,578 | 9/1979 | Mehta et al. | 423/235 |
| 4,203,959 | 5/1980 | Munster | 423/400 |
| 4,234,548 | 11/1980 | Burnell et al. | 423/235 |
| 4,242,321 | 12/1980 | Fattinger | 423/523 |
| 4,283,923 | 8/1981 | Bean | 423/385 |
| 4,288,421 | 9/1981 | Kudo et al. | 423/395 |
| 4,309,396 | 1/1982 | Herbrechtsmeier et al. | 423/393 |

FOREIGN PATENT DOCUMENTS

| | | | |
|---|---|---|---|
| 1387207 | 12/1964 | France | 423/235 |
| 127183 | 5/1919 | United Kingdom | 423/385 |
| 1494108 | 12/1977 | United Kingdom | . |

OTHER PUBLICATIONS

Sherwood et al., *Mass Transfer*, McGraw-Hill, 1975, pp. 346-351.

*Manufacture of Sulfuric Acid*, A.C.S. Monograph No. 144, 1959, pp. 104-115.

Sherwood, *Absorption and Extraction*, McGraw-Hill, 1975, pp. 378-382.

*Primary Examiner*—Gregory A. Heller
*Attorney, Agent, or Firm*—Hymen Diamond

[57] ABSTRACT

Gas containing nitrogen oxides is treated in two separate stages. In the first stage, the nitrogen oxides in the gas are reacted with sulfurous acid. The gaseous product of this reaction is reacted with an alkaline solution, typically caustic alkali. As a result of these treatments, the nitrogen oxides are converted into neutral salts.

15 Claims, 4 Drawing Figures

REMOVAL OF NITROGEN OXIDES FROM GAS

BACKGROUND OF THE INVENTION

This invention relates to the treatment of gases to remove pollutants, and has particular relationship to the removal of nitrogen oxides from gases containing these oxides to prevent the emission of these oxides to the atmosphere. Nitrogen oxides are known atmospheric pollutants and are believed responsible for the production of photochemical smog and "acid rain" phenomena. Although there are many chemically derivable oxides of nitrogen, the principal oxides implicated in atmospheric pollution are mixtures of the stable oxides, nitric oxide, NO, and nitrogen dioxide, $NO_2$, and their equilibrium compounds. These nitrogen oxides will be referred to herein as "$NO_x$".

Very high concentrations of $NO_x$ may be evolved in processes utilizing concentrated nitric acid in the chemical milling and passivation of stainless steels, tungsten, molybdenum, copper and the like, and the dissolution of precious metals. Lower concentrations of $NO_x$ are present in tail-gases from nitric acid manufacture (0.1 to 0.5% by volume) and in combustion flue gases from industrial furnaces or internal combustion engines. Various types of treatment processes have been proposed which involve either catalytic conversion or catalytic reduction of the nitrogen oxides, or wet scrubbing with various solutions of metal complexes or metallo-organic compounds. Catalytic methods of $NO_x$ removal generally require the use of elevated gas temperatures and the addition of a reducing agent such as $NH_3$, CO, $H_2$ or hydrocarbons. Catalytic $NO_x$ reduction methods become very expensive if the $NO_x$ concentrations are higher than normal flue gas $NO_x$ concentrations, or if the bulk gas must be heated from near ambient conditions to the elevated temperatures required for catalytic reduction. Therefore, catalytic $NO_x$ reduction processes are not normally applicable to processes generating high $NO_x$ concentrations in the exhaust gases; i.e., concentrations higher than 0.5% by volume (5,000 parts per million), or where the exhaust gases are at or near atmospheric or ambient temperatures.

Wet processes proposed for $NO_x$ absorption include various forms of aqueous alkaline solutions, transition metal complexes, and reductive reagents, such as catalyzed sulfite solutions, or oxidative reagents, such as permanganates. Processes employing transition metal complexes[1] and/or organic-compound-containing salts or reductive/oxidative chemicals, generate liquid waste byproducts which are themselves biotoxic water pollutants and cannot be sewered or easily disposed of. Wet process treatment with alkaline-earth oxides, hydroxides and carbonates, particularly calcium carbonates, has also been proposed, but these treatments have very unfavorable overall absorption kinetics for $NO_x$ and are ineffective unless very large and uneconomic sizes of equipment are employed.

[1] See Hishinuma U.S. Pat. No. 4,081,509 and Saitoh U.S. Pat. No. 4,087,372.

It is accordingly an object of this invention to overcome the disadvantages and drawbacks of the prior art and to remove nitrogen oxides from a gas effectively and at rapid, economic absorption rates, without the creation of by-product waste liquor pollution problems. It is an object of this invention to provide a method and apparatus for carrying out such removal.

SUMMARY OF THE INVENTION

This invention arises from the realization that wet scrubbing processes for $NO_x$ removal involving the use of water or aqueous solutions of salts depend on the absorption from the gas of an oxide of nitrogen as the primary rate-controlling step. The dissolution behavior of the various forms of oxides of nitrogen has been reviewed by Sherwood and Pigford[2] and Wilke[3]. The principal conclusions of these authors are:
1. NO is insoluble and unreactive toward water and aqueous alkaline solutions.
2. $NO_2$ has a very slow rate of solution in water, and the dissolution rate in caustic soda is slower than in water.
3. There are only two significant mass transfer processes which cause dissolution of gas-phase $NO_x$ in aqueous solutions: the absorption of nitrogen tetroxide, $N_2O_4$, and the absorption of nitrogen trioxide, $N_2O_3$.
4. At 25° C., $N_2O_3$ is only 30 percent as soluble in water as $N_2O_4$, but it reacts with water 40 times as fast, so that at equal concentrations of $N_2O_4$ and $N_2O_3$, the primary dissolution path is by way of $N_2O_3$.
5. Nitrogen tetroxide, $N_2O_4$, the dimer of $NO_2$, is formed in small equilibrium concentrations from $NO_2$, and the nitrogen trioxide, $N_2O_3$, is also formed in small concentrations from nitrogen dioxide, $NO_2$, and nitric oxide, NO:

$$NO_2 + NO \rightleftharpoons N_2O_3 \tag{1}$$

[2] Sherwood and Pigford, "Absorption & Extraction", pp. 377–385, McGraw-Hill, N.Y. 1952.
[3] Sherwood, Pigford and Wilke, "Mass Transfer", pp. 346–361, McGraw-Hill, N.Y. 1975.

In highly concentrated $NO_x$ gases the efficiency of nitrogen oxides absorption in high-pressure nitric acid absorbers is large, primarily because the reaction involving both diffusion and reaction of $N_2O_4$ is favored. For dilute gases or gases at atmospheric pressure however, the partial pressure of $N_2O_4$ becomes so small that the second reaction path involving $N_2O_3$ produces $HNO_3$ more efficiently. The basic problem is that the equilibrium concentration of both $N_2O_4$ and $N_2O_3$ in gases at atmospheric pressure is so small that both efficiency and rates of $NO_x$ absorption in aqueous systems, are low.

In the practice of this invention, the disadvantages and drawbacks of the prior art are overcome by a wet scrubbing process including two separate stages. In the first stage, the gas is treated with an aqueous solution of sulfurous acid. In the second stage, the gas leaving the first stage is treated with an alkaline or basic solution.

The two stages are indispensible because the first stage conversion-treatment alone provides for little or no removal of the total $NO_x$ from the gas phase. Omission of the first stage results in non-absorption of $NO_x$ in the basic-solution treatment stage and also causes the formation of $HNO_3$ and $HNO_2$ mist in the vapor phase with copious dense white acid mist emissions at high $NO_x$ concentrations. While the chemistry of this treatment has not been positively established, it is believed that the first-stage sulfurous-acid treatment converts the nitrogen oxides to a form that is rapidly and readily absorbed by the basic solution in the second stage. The two-stage system provides for removal of $NO_x$ and a final exhaust gas free of color, fume or acid gas content.

It is of interest to note that Collins, in U.S. Pat. No. 3,920,421, calls for the removal of $NO_x$ from gas streams also containing sulfur dioxide by absorption in water of the sulfur dioxide to form sulfurous acid as part of a single-stage reduction process. However, Collins reduces the nitrogen oxides to nitrogen and finds it necessary to add a multivalent metal, such as iron, to the solution to achieve this purpose. Similarly, Kudo and Haguvara, in U.S. Pat. No. 4,288,421, treat an exhaust gas containing both $NO_x$ and $SO_x$ with an absorbing solution containing an iron chelate salt and potassium sulfite in order to form imidodisulfonates. The present invention avoids the use of expensive or water-polluting catalysts and achieves $NO_x$ removal by a unique separation of in situ chemical conversion and absorption steps.

Possible chemical reactions involved in the invention will now be discussed. It is emphasized that these reactions are formulated based on hindsight and that there is no certainty that they are the reactions which actually occur. They are presented here with the thought that they provide a basis for understanding of the invention. It is to be understood that this presentation is in no way to be regarded as critical to, or limiting of, this invention and that the existence of other formulations which may logically describe the reactions of this invention in no way reflects negatively on the merit of this invention.

The process chemistry of this invention is believed to be essentially and ideally comprised of two separate steps:

(a) converting $NO_x$ in the gas under treatment to $N_2O_3$, and (b) reacting the $N_2O_3$ with aqueous alkaline solution. The conversion of $NO_x$ to $N_2O_3$ in the first-stage contactor is effected by scrubbing with sulfurous acid solution.

In the now-obsolete lead chamber process for the production of $H_2SO_4$, nitrogen oxides are used as the oxidant for $SO_2$, which is oxidized to $SO_3$. The $SO_3$ then reacts with water and/or is absorbed in $H_2SO_4$ in the Gay-Lussac tower where the nitrogen oxides are regenerated for recycle. If the process is now reversed, so that $SO_2$ or $H_2SO_3$ solutions are used to control the formation of soluble forms of gaseous nitrogen oxides, and/or liquid-phase complexes, the "old" chemistry may be utilized to explain the probable reaction sequence of the present invention.

The exact nature of the reactions between $SO_2$ and $NO_x$ in the lead chamber process was the subject of continuous investigations for some 50 years, (1895-1935) but the mechanisms were never fully clarified. The most self-consistent mechanistic explanations have been provided by Berl[4] in 1935, and earlier by Lunge and Berl[5] in 1906. Both reaction sequences involve intermediate compounds or complexes of NO, $NO_2$, $SO_2$ and $H_2O$. The compound common to both theoretical chain mechanisms is nitrosylsulfuric acid, $SO_5NH$, or structurally, as shown by Elliott[6], $(HO\text{-}SO_2ONO)$. Nitrosylsulfuric acid is stable in concentrated $H_2SO_4$, but undergoes rapid hydrolysis in $H_2O$ as follows:

$$2 SO_5NH + H_2O \rightarrow 2H_2SO_4 + NO + NO_2 \tag{2}$$

[4] Berl, E., Trans-Am. Inst. Chem. Engrs. 31, 193 (1935)
[5] Lunge, C., Z. Angew, Chem. 19, 807, 857, 881 (1906); Lunge, G., J. Chem. Soc. 47, 65 (1885)
[6] Elliott, G. A., Kleist, L. L., Wilkins, F. J., and Webb, H. W., J. Chem. Soc., 1219 (1926)

This reaction is the generating reaction for the desired equimolar mixture of $NO_2$ and NO, or $N_2O_3$. The mechanism of formation of the nitrosylsulfuric acid from $SO_2$, $NO_x$ and $H_2O$ was the subject of experimental and theoretical investigations of Lunge and Berl, who established that a second, transient complex, sulfonitronic acid, $(H_2SO_4).NO$, also called "violet acid" because of its intense color, was also involved. Although this compound has been synthesized in pure form, it occurs as a transient intermediate in the chain reaction leading (in the case of the chamber process) to the formation of $H_2SO_4$. Oxidation of sulfonitronic acid yields nitrosylsulfuric acid. The chain sequence postulated by Berl and Lunge can be stated as:

$$2SO_2 + 2H_2O \longrightarrow 2H_2SO_3 \tag{3}$$

$$2H_2SO_3 + 2NO_2 \longrightarrow 2NO.H_2SO_4 \tag{4}$$

$$2NO.H_2SO_4 + 0.5\ O_2 \longrightarrow 2SO_5NH + H_2O \tag{5}$$

$$2SO_5NH + H_2O \longrightarrow 2H_2SO_4 + N_2O_3 \tag{6}$$

$$2SO_2 + 2H_2O + 2NO_2 + 0.5\ O_2 \longrightarrow 2H_2SO_4 + N_2O_3 \tag{7}$$

While the individual reactions of the chain sequence are of both theoretical and practical interest (for the lead chamber operation) the net overall reaction, Reaction (7) is the statement of the first-stage chemistry of the present invention. Laboratory tests described below are consistent with the reaction sequence as written.

Laboratory investigation of the $SO_2$—$NO_x$—$H_2O$ system, confirmed qualitatively net Reaction (7) but not its stoichiometry. Of basic importance was the determination in the laboratory that less-than-stoichiometric addition of $SO_2$ with respect to $NO_x$ could be used. Most laboratory runs made were made with a ratio of $SO_2/NO_x$ of 0.5 or less. Additionally, although $SO_2$ is converted into $H_2SO_4$ in the first-stage, nitrosylsulfuric acid is stable only in concentrated $H_2SO_4$, and the very dilute aqueous solution of $H_2SO_3$ would make the presence of this compound somewhat suspect. Nevertheless, comparative laboratory runs with air and nitrogen verified the necessity for oxygen in the reaction sequence. In view of the uncertainty as to the actual formation of $N_2O_3$, the reaction of the first stage is frequently referred to in this application and in the claims as the conversion of the nitrogen oxides in the gas into a form in which they readily react with the alkaline solution. Based on the experience in arriving at this invention, this certainly occurs.

It should be noted that the transient complex, sulfonitronic acid, $NO.H_2SO_4$, can be considered as an unstable compound of NO and $H_2SO_4$, indicating that NO can participate in the chain sequence producing $N_2O_3$. Visual evidence of the formation of the sulfonitronic acid complex was obtained in a number of runs in which the amount of sulfurous acid solution was limited, and the $H_2SO_4$ was allowed to accumulate until a solution of pH of 0.5 was reached. At these high concentrations of $H_2SO_4$, the solution frequently turned violet on continued addition of nitrogen oxides and $SO_2$. Additionally, globs of violet liquid accumulated in the exhaust line from the conversion scrubber well prior to the change in solution color from colorless to violet. However, the change in solution color occurred well after the exhaustion point where the solution had lost its conversion ability. $H_2SO_4$ is both a byproduct and reactant in the reduction sequence, so that its formation in solution is not detrimental to the conversion reaction until it reaches a high enough concentration to inhibit the absorption of $SO_2$ gas (Reaction (3)). The $H_2SO_4$ concentration is controlled at the desired level by recycling the first-stage absorption liquor and bleeding off a part of the solution, replacing the solution blowdown with fresh water. The solution absorption capacity for $SO_2$ may be monitored by means of solution oxidation-reduction potential (ORP) and the solution $H_2SO_4$ concentration may be monitored by means of a pH indicator.

It is economically desirable to recover the $SO_2$ content of the recycle solution blowdown from the first stage contactor. Accordingly, it is preferred that the first stage blowdown liquor be stripped of its $SO_2$ content by air or steam in a conventional desorption device and that the stripper off-gas be fed back to the $SO_2$ absorber for reabsorption of the $SO_2$.

Some gas streams, particularly those generated in combustion processes wherein a sulfur-containing fuel oil, or coal, is used, inherently contains significant concentrations of $SO_2$. In such cases, it may not be necessary to add incremental $SO_2$ to either the gas fed to the first-stage scrubber, or to the first-stage recycle liquor. The combustion gas naturally containing both the $SO_2$ and $NO_x$ can be scrubbed with (initially) water, which upon continued recycle, becomes the sulfurous acid solution required for the operation of this invention. Although combustion gases are hot, the gas will rapidly quench to approximately the wet-bulb temperature upon contact with the first-stage aqueous liquor, or, more preferably, may be precooled prior to entry to the sulfurous acid-conversion scrubber. While the $SO_2$ solubility in the solution will decrease at increasing absorber temperatures, the decreased solubility is compensated for by the increase in the reaction rates at the higher temperatures.

There is a significant heat of reaction generated in the first-stage sulfurous acid conversion scrubber, and the adiabatic temperature rise of the liquid can be considerable at high $NO_x$ conversion rates. A theoretical estimate of solution adiabatic temperature rise may be obtained from net Reaction (7). Assuming a feed rate of one lb. mole of $SO_2$ per hour, the total heat liberated is comprised of the heat of solution of gaseous $SO_2$, plus the heat of reaction as represented by Reaction (7). The heat of solution is—15,410 Btu/lb mole of $SO_2$, and the heat of reaction is—136,764 Btu/lb mole of $SO_2$, giving a total exothermic quantity of—152,174 Btu/lb mole of $SO_2$. At a 1:2 ratio of $SO_2:NO_x$, this heat production corresponds to the conversion of 2 moles of $NO_x$, or 92 lbs. of $NO_x$ as $NO_2$. Assuming this quantity of $NO_x$ is fed to the first-stage conversion scrubber per hour, the temperature rise for once-through water fed to the scrubber at a rate of 10 GPM could be 30.3° F. under adiabatic conditions. Under recycle conditions, it would therefore be theoretically possible for the aqueous recycle solution to go to its boiling point. However, even under adiabatic conditions, the major heat sink is the evaporation of water, and evaporative cooling will generally prevent the recycle liquid from excessive temperature rise. The actual equilibrium temperature of the recycle absorption liquor depends on the $NO_x$ load, the $SO_2:NO_x$ ratio, the liquid/gas ratio, makeup rate and other factors. When these factors cannot be suitably controlled by design to ensure against excessive liquor temperatures, a heat exchanger may be placed in the recycle liquor loop of the first-stage scrubber to adequately cool the liquor.

In some processes, the gaseous $NO_x$ stream may be admixed with acid mists or with other acid gases, such as HCl. The latter acid gas would be normally present as a contaminant if aqua regia is used in the process which generates the $NO_x$. HCl is preferentially absorbed by water as compared to $SO_2$, and HCl and similarly highly-soluble acid gases will either displace $SO_2$ from a $H_2SO_3$ solution, or impede the dissolution of $SO_2$. Accordingly, it is desirable to prevent the penetration of such acid gases to the first-stage sulfurous acid scrubber, and an upstream pre-absorber is desirable when such acid gases are present. The pre-absorber may be any conventional contactor such as a spray chamber or packed scrubber, having sufficient absorption capacity for the removal of HCl and similar acid gases. If the concentration of $NO_x$ is very high, it is preferred that the pre-absorber aqueous scrubbing solution be neutral or acidic. The contact of alkaline solutions with high gaseous $NO_x$ concentrations results in the formation of copious amounts of nitric-acid fume and mist in the vapor phase. In the practice of this invention, the $NO_x$ is converted in the first stage scrubber to a form which does not form the nitric-acid fume and mist on subsequent contact with alkaline solutions.

Similarly, in applications where there are acid mists contained in the gas to be treated, the presence of such mists in the sulfurous acid scrubber is undesirable because of the possibility of inhibition of $SO_2$ dissolution. Accordingly, it is preferred that acid mists, including nitric acid mists, be removed upstream of the sulfurous acid scrubber by means of a suitable efficient mist eliminator.

The second-stage contactor utilizes an aqueous solution of a basic alkali metal or alkaline-earth or ammonium salt or hydroxide, selected from the group of alkaline salts, or hydroxides and their mixtures, for the absorption of the reactive nitrogen oxides generated in the first-stage. Another function of the second-stage alkaline scrubber is to absorb any excess $SO_2$ coming over from the first-stage gas-liquid contactor, preventing emission of $SO_2$ from the combined system. As long as free alkali is present in the second-stage liquor, there is no danger of significant $SO_2$ emission from the second-stage. Nevertheless, any excess $SO_2$ coming over from the first-stage represents a potential reagent loss and it is preferred to minimize first-stage $SO_2$ evolution by avoiding saturation or near-saturation operating conditions for the first-stage scrubbing liquor. However, it was noted during the course of development of this invention that alkaline sulfites, which would be formed by carryover of $SO_2$ into a second-stage alkaline liquor scrubber, are also fairly effective in the absorption of nitrogen oxides, so that some degree of $SO_2$ carryover enhances second-stage $NO_x$ removal, rather than inhibiting it, and $SO_2$ carryover is not wholly detrimental.

Even without recovery of $SO_2$ from first-stage scrubber blowdown, the consumption of reagent for the process is economically acceptable. For a typical application involving concentrations of $NO_2$ of 33 mg/m$^3$ and NO of 0.7 mg/m$^3$ at a total flow of 1.113 kg/hr of $NO_x$, 24 hrs/day, a flow of 0.783 kg/h of $SO_2$ would be required if the molar input rate of $SO_2$ was half that of the $NO_x$. This amounts to a total consumption of 18.79 kg/day of $SO_2$, or at a unit cost of $0.231/kg, a total cost of $4.34/day for the $SO_2$ cost. To this cost, the cost of the NaOH, or other alkaline reagent consumed in the second-stage, must be added. However, the NaOH reaction costs will be incurred in any process scheme for removal of $NO_x$ as nitrite or nitrate salt, so that the incremental cost of the two-stage operation is represented by the $SO_2$ cost of $4.34/day.

The reactive forms of $NO_x$ absorbed in the second-stage scrubber rapidly react with the alkaline solution to form soluble nitrites and nitrates. As in the first-stage scrubber, recycle liquor operation is desirable in the second-stage scrubber to conserve reagent chemicals. Assuming the use of NaOH as the alkaline reagent in the second-stage scrubber, the theoretical generation of $N_2O_3$ in the $H_2SO_3$ scrubber should yield the following second-stage reaction:

$$N_2O_3 + 2\ NaOH \rightarrow 2NaNO_2 + H_2O \tag{8}$$

Assuming the dominance of Reaction (8) in the second-stage scrubber, the liquor and the blowdown liquor from the scrubber will contain nitrites and sulfites, which would have a very high chemical oxygen demand (COD) if allowed to go directly to sewer. While some oxidation will be effected by the contact with air or gas phase oxygen in the scrubber itself, it is desirable to reduce the COD of the blowdown from second-stage liquor by oxidation in a separate aeration unit prior to disposal.

The oxidized blowdown liquor from the second-stage scrubber contains residual caustic salts plus neutral salts such as sulfates and nitrates. The stripped liquor blowdown from the first-stage scrubber is acidic. One stream may be used to fully or partly neutralize the other so that subsequent sewage treatment loads are minimized.

The heat generated in the second-stage scrubber is also significantly exothermic, with an estimated heat of reaction of $-18,180$ Btu/lb mole of $N_2O_3$ from Reaction (8). Additionally, if solid NaOH is used for replenishing the alkaline strength of the second-stage solution, the heat of solution of $-18,360$ Btu/lb mole of NaOH is additive to the heat of the chemical reactions. Heat exchange in the scrubber recycle liquor loop is desired to control the temperature of the absorber if the evaporative cooling effects are insufficient.

In certain applications of the process of this invention to gas streams containing very high concentrations of $NO_x$, it may be economically desirable to recover $HNO_3$ in an upstream pre-scrubber. This may be done by countercurrent pre-scrubbing of the gas with water or dliute $HNO_3$ to effect the partial absorption of $NO_2$ or $N_2O_4$, and the conversion of the dissolved nitrogen oxides to $HNO_3$ by hydrolysis in the liquid phase. Although such a pre-scrub operation is effective for only partial absorption of $NO_x$, it does provide for some recovery of reusable $HNO_3$, and reduces the downstream process load and reagent consumption.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF INVENTION

Figure 1:
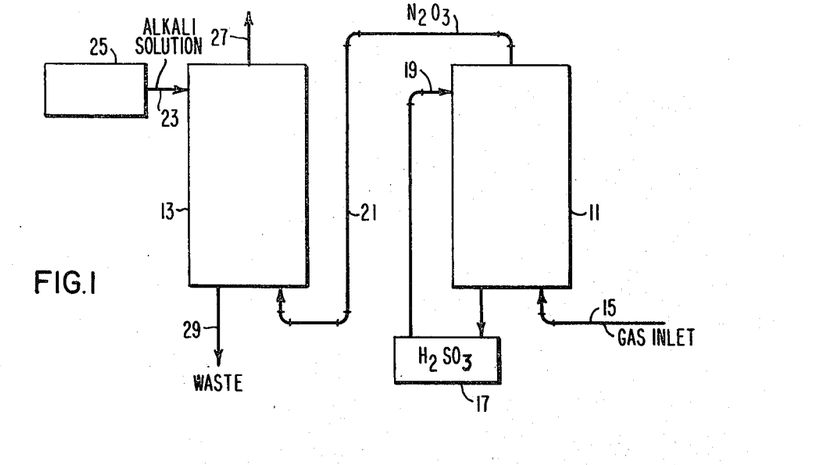
FIG. 1 is a block diagram showing the basic features of the invention.

The apparatus shown in FIG. 1 includes a first scrubber 11 and a second scrubber 13. In the first scrubber 11 the gas to be treated is reacted with $H_2SO_3$ and in the second scrubber 13, the gas product of the reaction in the first scrubber is reacted with an alkaline solution, typically NaOH, an aqueous solution, of 2 to 25% by weight, preferably 4–10% by weight. The gas to be treated is injected into the first scrubber at its gas input 15. The first scrubber 11 includes a source 17 of $H_2SO_3$ which is supplied to a second input 19. The $H_2SO_3$ reacts with the $NO_x$ in scrubber 11. The gaseous product of this reaction is predominately $N_2O_3$. This product is supplied to scrubber 13 through input 21. At another input 23 to scrubber 13, an alkaline solution from a source 25 is supplied. This solution is typically caustic soda, NaOH, or potassium hydroxide. The treated gas free of $NO_x$ is derived from output 27 of scrubber 13. The liquid product of the reaction of the $N_2O_3$ and the alkaline solution is derived from output 29 of scrubber 13 and is treated as waste.

Figure 2A:
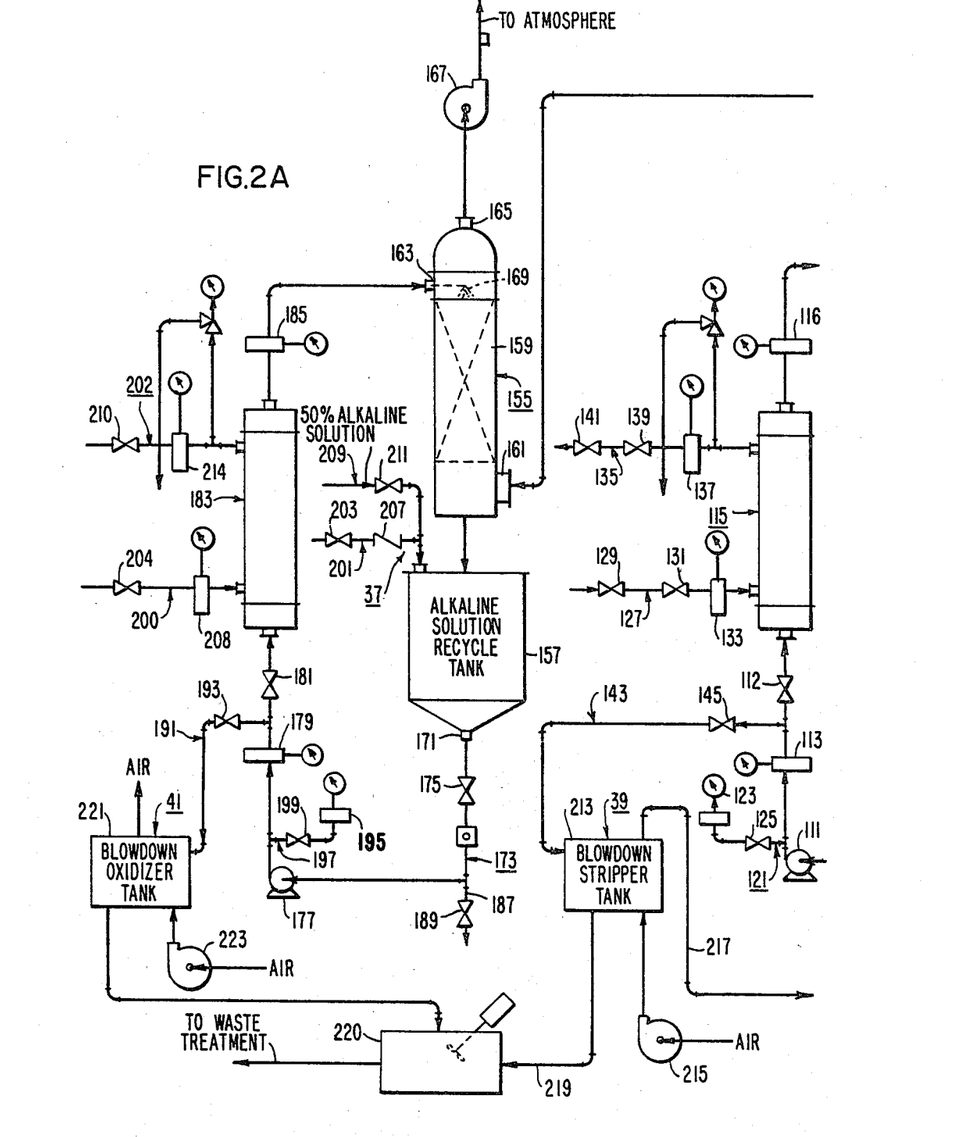
FIGS. 2A and 2B together consitute a diagrammatic view showing apparatus in accordance with this invention and for practicing the method of this invention on a commercial scale.
Figure 2B:
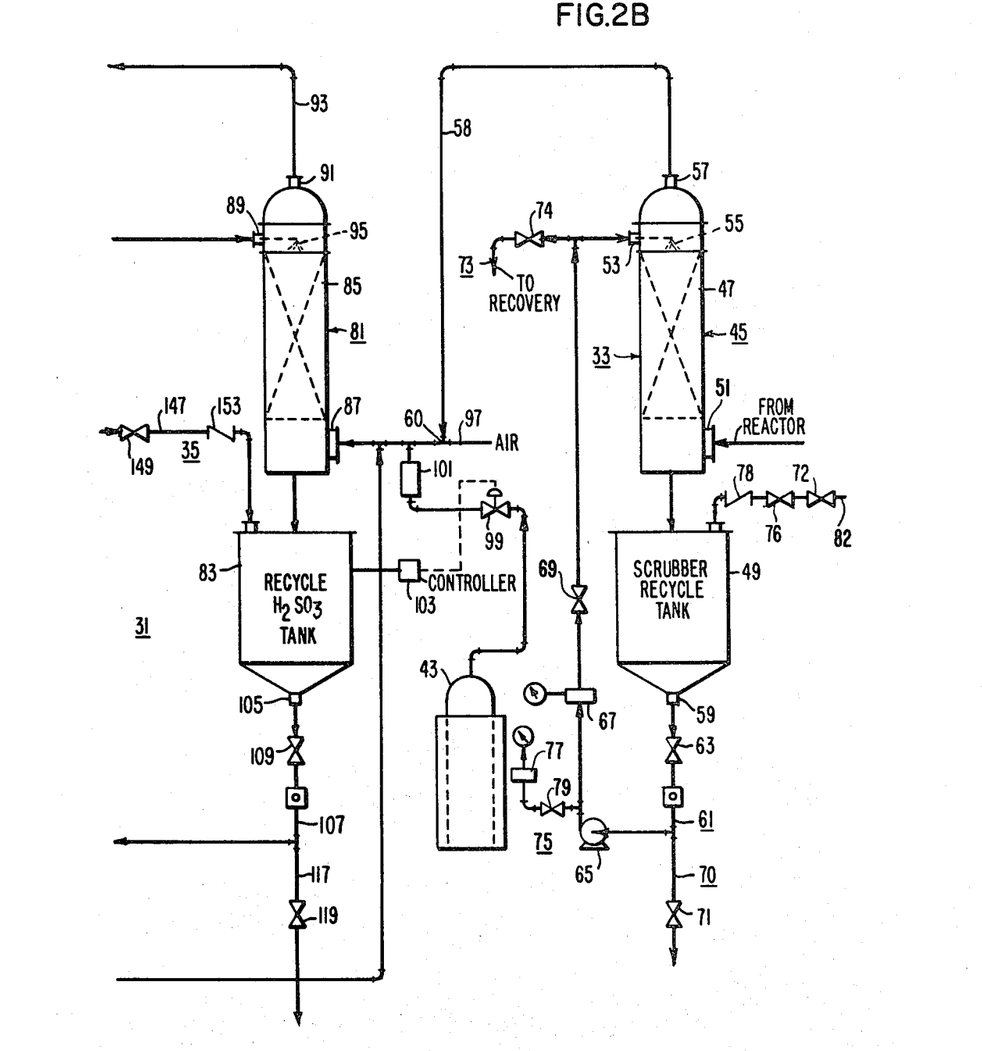

FIGS. 2A and 2B together show apparatus 31 for treating gas containing $NO_x$. This apparatus includes an upstream water pre-scrubber 33, an $H_2SO_3$ scrubber 35 and an alkaline-solution scrubber 37. A blowdown stripper 39 is cooperatively connected to the $H_2SO_3$ scrubber 35 and a blowdown oxidizer 41 is cooperatively connected to the alkaline solution scrubber 37. There is also a source of $SO_2$ which may be one or more bottles or cylinders 43. Ancillary components including pumps, valves and indicators are associated with each of the scrubbers.

The upstream water scrubber 33 includes a scrubbing tower 45 and a scrubber recycle tank 49. The tower 45 has packing which may be of suitable type such as Pall rings or the packing disclosed in U.S. Pat. No. 4,238,386 to Bernard J. Lerner. The tower 45 is vertical and has a gas inlet 51 below the packing and an inlet or header or header 53 above the packing. The gas to be treated containing the $NO_x$ flows through inlet 51 and water or recycle acid is supplied to a distributor 55 through inlet 53. The liquor flows through the packing in countercurrent-flow relationship to the gas absorbing a fraction of the $NO_x$ and any HCl from the gas to be treated. The resulting liquid flows into tank 49. In its top, the tower 45 has an outlet 57 for the treated gas. This outlet is connected to duct 58.

Water or recycle acid for the distributor 55 is derived from the tank 49. The tank 49 has an outlet 59 in its base which is connected to inlet 53 through a line 61 which includes a valve 63, a pump 65, a temperature indicator 67 and a valve 69. The pump 65 drives the liquor from tank 49 to the distributor 55.

The water or dilute $HNO_3$ flowing from the distributor reacts with the gas in the packing 47 to produce nitric acid. The nitric acid may be removed batchwise or continuously through a branch line 73 including valve 74 when it reaches a predetermined concentration. Pressure of the liquid discharged from the pump is measured in branch line 75 which includes indicator 77 and valve 82. The liquor in tank 49 may be replenished through a makeup water line 79 which includes control valve 72 and 76 and check valve 78. The valve 76 is controlled dependent upon the level of the liquid in tank 49. The valves 63, 69, 71 and 74 may be manually operable by the attendant of the apparatus or all or some of these valves may be responsive automatically to conditions in the system such as the concentration of the $HNO_3$ in the recycle liquor.

The $H_2SO_3$ scrubber 35, like the scrubber 33, includes a vertical scrubbing tower 81 and a recycle tank 83. The tower 81 has packing 85 similar to the packing in tower 45, an inlet 87 for the gas from tower 45, an inlet or header 89 for the recycle liquid $H_2SO_3$ solution and an outlet 91 for the treated gas. The outlet 91 is connected to duct 93. Through inlet 89, the recycle $H_2SO_3$ solution is supplied to the distributor 95. The $H_2SO_3$ solution is distributed over the packing 85 and flows in countercurrent relationship to the gas entering the tower from duct 58 through the gas inlet 87, and drains into recycle tank 83. The $H_2SO_3$ solution reacts with the $NO_x$ content of the input gas exothermically.

The duct 58 is connected to the tower gas inlet 87 through a junction 60 which may be a T-joint and inclues a branch 97 for supplying supplementary air to tower 81 if no oxygen is initially present in the gas in duct 58. In addition, $SO_2$ is supplied to inlet 87 from tank 43 through a valve 99 and a rotameter 101 which measures the flow rate of the $SO_2$ into inlet 87.

The recycle tank 83 has an outlet 105 which is connected to the distributor 95 through a line 107 which includes valve 109, pump 111 (FIG. 2A), temperature indicator 113, valve 112, heat exchanger 115, temperature indicator 116, and tower inlet header 89. The pump 111 circulates the liquid from tank 83 to the distributor 95.

A branch line 117 including valve 119 is connected to line 107 for removing liquid from tank 83 under predetermined conditions. Pump discharge pressure in line 107 is measured by a pressure indicator 123 (FIG. 2A). The recycle liquid passing through heat exchanger 115 is cooled by coolant which flows through the primary tubing (not shown) of the exchanger through inlet line 127, including valves 129 and 131 and temperature indicator 133 and outlet line 135 including temperature indicator 137 and valves 139 and 141. Valves 129 and 131 may be controlled in accordance with the measurement of indicator 133 and valves 139 and 141 may be controlled in accordance with the indications of 137.

At the start of an $NO_x$ removal operation tank 83 contains water. Initially, the valve 99 responding to the oxygen-reduction-potential controller 103 is fully open so that substantial quantities of $SO_2$ are fed into tower 81. The $SO_2$ reacts with the recycle water from tank 83 producing $H_2SO_3$ in increasing concentraton. As the concentration of $H_2SO_3$ increases, the controller 103 causes valve 99 to be throttled reducing the flow of $SO_2$ appropriately. During operation, the liquid in tank 83 will contain $HNO_2$, $HNO_3$, $H_2SO_4$ and $H_2SO_3$. When the concentrations of these acids reaches limited or predetermined magnitudes, the liquid in tank 83 is drawn off through valve 119 or through branch line 143 to the blowdown stripper 39. Line 143 includes valve 145. The water in tank 83 is replenished through line 147 including control valve 149 and check valve 153.

Valve 149 may be controlled in accordance with the level in tank 83.

Instead of being fed directly into the scrubber tower 81, the $SO_2$ may be supplied to tank 83 or to the circulating liquid prior to the operation of scrubber 35. If this procedure is adopted, half the quantity of $SO_2$ necessary for saturation of the liquid in tank 83 may be supplied to the tank before operation. During operation, the $SO_2$ may be admitted to the scrubber 81 at a reduced rate.

The blowdown stripper 39 includes tank 213. Air is forced through this tank 213 by compressor 215. The air strips the $SO_2$ from the liquid which flows into the tank through line 143 and feeds it back into input 87 of $H_2SO_3$ tower 81 through duct 217. The air supplied by compressor 215 also flows into tower 81. The liquid from the tank 213 also flows to a waste treatement facility (not shown) through line 219. This liquid includes $H_2SO_4$ and $HNO_3$ and flows into a mixing tank 220.

The alkaline-solution scrubber 37, like scrubbers 33 and 35, includes a vertical scrubbing tower 155 and a recycle tank 157 into which the liquid from the tower drains. The tower 155 includes packing 159 similar to the towers 45 and 81, an inlet 161 for the gas in duct 93, an inlet or header 163 for alkaline solution and a top outlet 165 for the treated gas. The outlet 165 is connected to the blower 167 which exhausts the treated gas to the atmosphere and maintains a small negative pressure (suction) in the ducts 58 and 93. The gas from duct 93 is supplied to the bottom of packing 159 and the treating alkaline liquid is supplied to a distributor 169 on top of the packing 159.

The tank 157 contains alkaline solution typically NaOH or KOH. The concentration of the alkali may be between 1 and 20%, but is typically about 4 or 5%. The alkaline solution absorbs and reacts with the reactive forms of $NO_x$ derived from the first-stage 35.

Tank 157 has an outlet 171. Liquor from this outlet is recycled to the distributor 169 through line 173 including valve 175, pump 177, temperature indicator 179, valve 181, heat exchanger 183, temperature indicator 185 and inlet 163. The alkaline solution from distributor 169 flows through the packing 159 in countercurrent flow to the gas from duct 93. The alkaline solution absorbs and reacts with the reactive forms of $NO_x$ derived from the first-stage 35. The product of this reaction may include nitrites, sulfites, nitrates and sulfates.

A branch line 187 including valve 189 is connected to line 173 for draining off the liquid in tank 157 as desired. This liquid is also discharged to blowdown oxidizer 41 through branch line 191, which includes valve 193 in the pump discharge branch line. Pressure in line 173 is measured by indicator 195 in branch line 197 which includes valve 199.

The water in tank 157 is replenished through line 201 which includes control valve 203 and check valve 207. Alkaline solution is supplied to tank 157 through line 209 which includes valve 211. Typically, the makeup alkaline solution supplied has a concentration of about 50%. Valve 203 is controlled in accordance with the level in tank 157.

The primary tubing (not shown) of heat exchanger 183 is supplied with coolant through inflow duct 200 and outflow duct 202. Inflow duct 200 includes valve 204 and temperature indicator 208 and outflow duct 202 includes valve 210 and temperature indicator 214.

The blowdown oxidizer includes tank 221. Tank 221 is supplied with air by compressor 223. The air oxidizes the sulfites and nitrites which flow into tank 191 from tank 157. Where the alkaline solution is NaOH, the nitrites and sulfites are predominately $NaNO_2$ and $Na_2SO_3$. These are reducing agents whih have a high chemical oxygen demand (COD) injurious to marine life. They are converted in the tank 221 to harmless or beneficial $NaNO_3$ and $Na_2SO_4$. The output of tank 221 flows into mixing tank 220. The liquid from tank 157 includes alkaline solution, typically NaOH. This solution reacts with the $H_2SO_4$ and $HNO_3$ in mixing tank 220. The output of tank 221 flows into mixing tank 220 which also receives the output of tank 213. The outputs of tanks 213 and 220 react to neutralize each other partially or wholly. The output of mixing tank 220 flows into the waste treatment facility.

Figure 3:
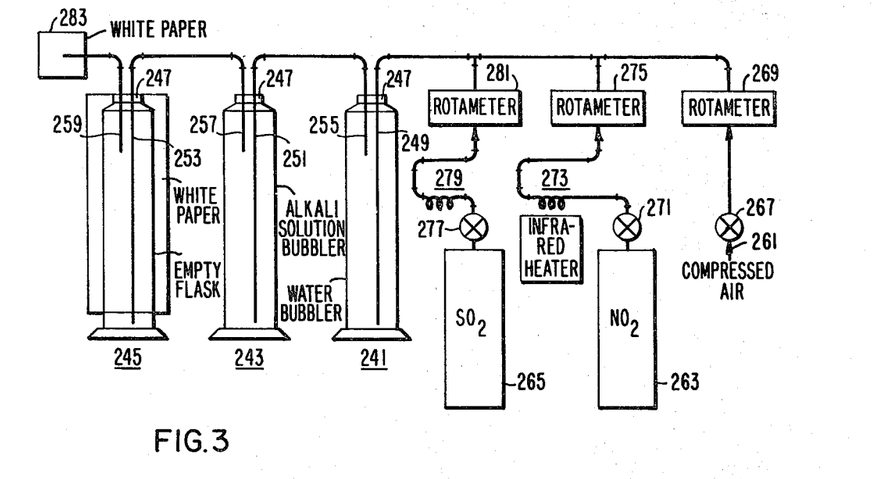
FIG. 3 is a diagrammatic view of apparatus with which the effectiveness of this invention in removing $NO_2$ from a gas under treatment is demonstrated.

Tests to evaluate the efficacy of the invention were conducted with the apparatus shown in FIG. 3. This apparatus includes a plurality of bubbler flasks 241, 243 and 245. Each flask is provided with a stopper 247. A long inlet tube 249, 251, and 253 extends into each flask through its stopper 247. Each inlet tube terminates near the bottom of its flask. A short outlet tube 255, 257 and 259 extends into each flask through its stopper. Each outlet tube terminates near the top of its flask. The apparatus shown includes a compressed air line 261, an $NO_2$ cylinder 263 and an $SO_2$ cylinder 265. The compressed air line 261, the $NO_2$ cylinder 263, and the $NO_2$ cylinder 265 are connected in parallel to inlet tube 249. The compressed air line is connected to inlet tube 249 through a valve 267 and a rotameter 269; the $NO_2$ cylinder 263 is connected to the tube through a valve 271, an infra-red heater 273 and a rotameter 275; the $SO_2$ cylinder 265 is likewise connected through valve 277, heater 279 and rotameter 281. The heaters 273 and 279 serve to prevent the formation of $SO_2$ or $NO_2$ liquid when the valves 271 and 277 are opened. The short outlet tube 255 of flask 241 is connected to long tube 251 of flask 243 and the short outlet tube 257 of flask 243 is connected to long inlet tube 253 of flask 245. The treated gas is emitted from short tube 259 in flask 245 and is observed against the background of a white paper 283. The gas may also be observed in flask 245.

Prior to a test, water is poured into flask 241. The level of the water is near the top of the flask but below the end of outlet tube 255. Also, the alkaline solution to be investigated is poured into flask 243 to a level near the top of the flask, but below the end of outlet tube 257. Flask 245 is empty. The flow of compressed air is then started. If flask 241 is to contain $H_2SO_3$, the appropriate quantity of $SO_2$ is bled into flask 241 through inlet tube 249 under the action of the compressed air.

During the test, $NO_2$ is fed into flask 241 through inlet tube 249 under the action of the compressed air. The emission into and through flask 245 is then observed. When the $NO_2$ breaks through, a reddish-brown color is seen against the white paper 283. The time which elapses between the start of the injection of the $NO_2$ and the appearance of the reddish-brown color is measured. A short interval indicates that the $H_2SO_3$ and/or the solution in flask 243 are ineffective in absorbing the $NO_2$; a long interval indicates that the $H_2SO_3$ and the alkaline solution are effective in removing $NO_2$.

The results of a series of tests are shown in the following Table III:

TABLE III

| Run No. | Break Thru Time (min) | Flask 241 500 Grms. Solution | Flask 243 500 Grams. Solution | Air cc min. | $NO_2$ cc min. | $SO_2$ cc min. | Comments |
|---|---|---|---|---|---|---|---|
| 93 | 33.8 | 5% NaOH 2% $Na_2SO_2$ 500 ppm PPD | | 500 | 300 | | Air 1600 cc/min. 20 min. before White mist as usual Colors as usual |
| 94 | 19.2 | 5% NaOH 2% $Na_2SO_3$ 100 ppm PPD | | 500 | 300 | | Air 1600 cc/min. 20 min. before |
| 95 | 23.1 | 5% NaOH 2% $Na_2SO_3$ 200 ppm PPD | | 500 | 300 | | Air 1600 cc/min. 20 min. before |
| 96 | 26.7 | 5% NaOH 5% $Na_2SO_3$ 200 ppm PPD | | 500 | 300 | | Air 1600 cc/min. 20 min. before |
| 97 | 14.3 | 5% NaOH 5% $Na_2SO_3$ | | 500 | 300 | | Air 1600 cc/min. 20 min. before |
| 98 | 18.3 | 5% NaOH 5% $Na_2SO_3$ | | 500 | 300 | | Air 1600 cc/min. 20 min. before |
| 99 | 16.5 | 5% NaOH 5% $Na_2SO_3$ | | 500 | 300 | | Air 1600 cc/min. 20 min. before |
| 100 | 21.65 | 5% NaOH 2% $Na_2SO_3$ 500 ppm TBHQ | | 500 | 300 | | Air 1600 cc/min. 20 min. before Sol. beige before air Sol. dark cream w/air No white smoke during run During run sol. gets lighter Color - Light yellow |
| 101 | 13.7 | 5% NaOH 2% $Na_2SO_3$ 500 ppm Propyl Gal. | | 500 | 300 | | Air 1600 cc/min. 20 min. before Sol. yellow before air Wine red after During run sol. color lightens |
| 102 | 6.1 | 5% NaOH 2% $Na_2SO_3$ | | 500 | 300 | | Air 1600 cc/min. 20 min. before |
| 103 | 15.25 | 5% NaOH 2% $Na_2SO_3$ 200 ppm PPD | | 500 | 300 | | Air 1600 cc/min. 20 min. before Sol. amber - deepens w/$NO_2$ Much white smoke |
| 104 | 16.33 | 5% NaOH | | 500 | 300 | | Air 1600 cc/min. 20 min. before |

4,400,362

TABLE III-continued

| Run No. | Break Thru Time (min) | Flask 241 500 Grms. Solution | Flask 243 500 Grams. Solution | Air cc min. | NO₂ cc min. | SO₂ cc min. | Comments |
|---|---|---|---|---|---|---|---|
| | | 2% Na₂SO₃ 200 ppm PPD | | | | | Much less amber color before run |
| 105 | 17.45 | 5% NaOH 2% Na₂SO₃ 400 ppm PPD | | 500 | 300 | | Air 1600 cc/min. 20 min. before White smoke-very heavy (obscures end point) |
| 106 | 17.7 | 5% NaOH 2% Na₂SO₃ 50 ppm PPD | | 500 | 300 | | Air 1600 cc/min. 20 min. before Light white mist (smoke) (acid) |
| 107 | 15.45 | 5% NaOH 2% Na₂SO₃ 50 ppm PPD | | 500 | 300 | | Air 1600 cc/min. 20 min. before Acid Mist as before Solution amber |
| 108 | 14.75 | 5% NaOH 2% Na₂SO₃ 50 ppm TBHQ | | 500 | 300 | | Air 1600 cc/min. 20 min. before Sol. begins w/slight amber cast Deep amber w/air - clears w/NO₂ White acid mist w/50 ppm PPD |
| 109 | 13.25 | 5% NaOH 2% Na₂SO₃ 50 ppm TBHQ | | 500 | 300 | | Air 1600 cc/min. 20 min. before Colors and mist same as #108 |
| 110 | 10.00 | 5% NaOH 2% Na₂SO₃ | | 500 | 300 | | Air 1600 cc/min. 20 min. before |
| 111 | 13.1 | 5% NaOH 2% Na₂SO₃ 20 ppm PPD | | 500 | 300 | | Air 1600 cc/min. 20 min. before |
| 112 | 7.6 | 5% NaOH 2% Na₂SO₃ | | 500 | 300 | | Air 1600 cc/min. 20 min. before |
| 113 | 11.6 | 5% NaOH 2% Na₂SO₃ 100 ppm TBHQ | | 500 | 300 | | Air 1600 cc/min. 20 min. before |
| 114 | 12.9 | 5% NaOH 2% Na₂SO₃ 100 ppm TBHQ 5 ppm PPD | | 500 | 300 | | Air 1600 cc/min. 20 min. before |
| 115 | 10.9 | 5% NaOH 2% Na₂SO₃ 200 ppm Triethanol Am. | | 500 | 300 | | Air 1600 cc/min. 20 min. before Small amount of white mist |
| 116 | 8.3 | 5% NaOH 2% Na₂SO₃ 200 ppm Benzyl Alchl. | | 500 | 300 | | Air 1600 cc/min. 20 min. before Small amount of white mist |
| 117 | 6.25 | 5% NaOH 2% Na₂SO₃ 200 ppm Sugar | | 500 | 300 | | Air 1600 cc/min. 20 min. before Moderate amount of mist colors immediately |
| 118 | 9.0 | 5% NaOH 2% Na₂SO₃ 200 ppm Sugar | | 500 | 300 | | Air 1600 cc/min. 20 min. before Moderate white mist colors within first 2 min. of run |
| 119 | 12.7 | 5% NaOH 2% Na₂SO₃ 200 ppm Mond-Ethanol Amine | | 500 | 300 | | Air 1600 cc/min. 20 min. before Much white mist |
| 120 | 16.5 | 5% NaOH 2% Na₂SO₃ 100 ppm mixed inh. 1:10:100 PPD TBHQ: MEA | | 500 | 300 | | Air 1600 cc/min. 20 min. before |
| 121 | 0.6 | H₂O Sat. w/SO₂ | | 500 | 300 | | SO₂ in AM. Run 2 pm |
| 122 | 4.25 | H₂O Sat. w/SO₂ | | 500 | 300 | | Run immediately Lots of moisture |
| 123 | 2.30 | H₂O | | 500 | 300 | | |
| 124 | 11.3 | H₂O Sat. w/SO₂ | | 500 | 300 | | A lot of moisture. Sol. turns violet late in run. Sol. gets very warm during run. Gas evolves after run. |
| 125 | 17.3 | H₂O Sat. w/SO₂ | | 500 | 300 | | Sat. and allow to sit 1 hr. Brown cloud immediately, disappears in few seconds. Blue liquid forms in outlet line from flask. |

TABLE III-continued

| Run No. | Break Thru Time (min) | Flask 241 500 Grms. Solution | Flask 243 500 Grams. Solution | Air cc min. | NO₂ cc min. | SO₂ cc min. | Comments |
|---|---|---|---|---|---|---|---|
| 126 | 48.5 | H₂O Sat. SO₂ | 5% NaOH | 500 | 300 | | Brown cloud forms in 241 immediately, which disappears in few seconds. Frothing blue liquor in line between #1 and #2. Sol. #1 slightly warm. Sol. #2 very warm. |
| 127 | 8.5* *step 1 | H₂O Sat. w/SO₂ | | 500 | 300 | 100 | White solid forms in outlet line, Increasing SO₂ rate reverses end-point. |
| 128 | 66.3 | H₂O | 5% NaOH | 500 | 300 | 300 | White solid forms in inlet 249 to flask 241 frothing blue liquor forms in line between 241 and 243. Brown gas in line between 241 and 243. End point is very sharp. 241 sol. slight warm. 243 sol. very warm. White solids finally plug line. |
| 129 | 50.3 | H₂O Sat. w/SO₂ | 5% NaOH | 500 | 300 | trickle | Sat. w/SO₂ before run. Reintroduce SO₂ 5 min. into run. No white solids build up. Solutions not so warm as before. At end, increase SO₂ to 300 cc/min. 56 min. 243 sol. turned violet. 59.6 min. second breakthru. |
| 130 | 50.4 | H₂O | 5% NaOH | 500 | 300 | 300 | Duplicate #128 |
| 131 | 77.8 | H₂O | 5% NaOH | 500 | 300 | 150 | SO₂ start first. Some clogging from white solids near end of run. 243 sol. turned violet just before break thru. |
| 132 | 60.7 | H₂O | 5% NaOH | 500 | 300 | 150 | Forced to terminate because of plugging with white solids. |
| 133 | See comments | 5% NaOH | | 500 | 300 | | Small amount brown gas immediately. 2.5 min. copious brown gas. 7.5 min. increase SO₂ 700 cc/min. for 1 min.- gas reduced. 9.5 min. copious brown gas as before. Sol. very hot. |
| 134 | Immed. | 5% NaOH | | 500 | 300 | | SO₂ 700 cc/min. 2 min. before - brown gas immediately. Solution hot. |

In Table III, the numbers in the left-hand column identify the run or test, the NO₂ breakthrough time in minutes is in the second column from the left, the content of alkaline solution in flask 241 is in the third column, the content of H₂SO₃ in flask 243 is in the fourth column, the flow of compressed air in cubic centimeters per minute is in the fifth column, the flow of NO₂ in cc per minute is in the sixth column, and the flow of additional SO₂ in cc per minute is in the seventh column. The eighth column describes other parameters of the tests and unusual observations.

The initial portion of the program, represented by runs 93 through 120 in Table III, was an investigation of the possibility of inhibiting the oxidation of single-stage sodium sulfite or caustic/sulfite solutions when used to absorb NO$_x$ from air. For the usual case where NO$_x$ is admixed with air or oxygen, the sulfite solution is rapidly oxidized to sulfate, rendering the solution ineffective. The uninhibited-solution runs 97-99 show an average of 16.3 minutes for NO$_x$ color breakthrough time. The various oxidation inhibitors tried included paraphenylene diamine (PPD), tributylhydroquinone (TBHQ), propyl gallol, triethanolamine, benzyl alcohol, and sugar, none of which significantly improved the breakthrough time, and most of which depressed the breakthrough time. Experiments omitting the sulfite and caustic, and using a single-stage sulfurous acid scrubbing solution, Runs 121-122 and 124-125, showed some interesting solution color change behavior, but no improvement on NO$_x$ breakthrough time. The "discovery" run, Run 126, used the two stages of scrubbing in series H₂SO₃ followed by 5% NaOH, and gave a breakthrough time of 48.5 minutes. The blue liquid observed in the line between the two bubbler flasks is suspected of being N₂O₃, which is a blue liquor, but no positive identification of this material could be obtained because of its unstable nature.

The results of tests 126 and 128 through 132 demonstrate the efficacy of the invention in removing NO₂.

While preferred embodiments of this invention have been disclosed herein, many modifications thereof are feasible. This invention is not to be restricted except insofar as is necessitated by the spirit of the prior art.

I claim:

1. The method of removing nitrogen oxide and nitrogen dioxide from a gas comprising reacting the nitrogen oxides with sulfurous acid, and oxygen in a wet scrubbing operation, thereafter reacting the gaseous product of the reaction of the sulfurous acid and oxygen and the nitrogen oxides with an alkaline solution in a wet scrubbing operation to convert the said product into a salt, the reaction of the nitrogen oxides with the sulfurous acid and oxygen converting the nitrogen oxides into a compound which is readily converted into a salt.

2. The method of claim 1 wherein the sulfurous acid is continuously formed by flowing sulfur dioxide into water.

3. The method of claim 2 wherein, prior to the reaction of the nitrogen oxides in the gas with sulfurous acid, the gas is contacted by water to remove any components of the gas which inhibit the formation of sulfurous acid from the sulfur dioxide and water.

4. The method of claim 1 wherein liquid effluent from the reaction of the gas with sulfurous acid which liquid effluent includes excess sulfur dioxide and nitrogen oxides is added back to the reaction of the sulfurous acid and the gas.

5. The method of claim 1 wherein the product of the reaction of the nitrogen oxides in the gas and sulfurous acid, which is converted into a salt by reaction with alkaline solution, is predominantly compounds which are more soluble in and more reactive with said alkaline solution than nitric oxide and nitrogen dioxide.

6. The method of claim 1 wherein the reaction of the nitrogen oxides with the sulfurous acid is carried out by countercurrent contacting the sulfurous acid and the gas containing the nitrogen oxides.

7. The method of claim 1, wherein the sulfurous acid is produced by reacting water with sulfur dioxide and wherein sulfuric acid is produced in the reaction of the nitrogen oxides and the sulfurous acid and the concentration of the said sulfuric acid is monitored and controlled to prevent the sulfuric acid from reaching a high level at which it inhibits the reaction of the sulfur dioxide and the water.

8. The method of claim 7, wherein the liquid containing the sulfuric acid is drained off and replaced by water to prevent the sulfuric acid concentration from reaching the high level.

9. The method of claim 7, wherein the solution capacity for sulfur dioxide of the liquid in which the nitrogen oxides are reacted with the sulfurous acid in the wet scrubbing operation is monitored by measuring the oxidation-reduction potential of the liquid and the concentration of sulfuric acid is monitored by measuring the pH of the liquid.

10. The method of removing nitrogen oxide and nitrogen dioxide, from gas comprising reacting the nitrogen oxides in the gas with sulfurous acid and oxygen in a wet scrubbing operation to convert the nitrogen oxides into a nitrogen-oxygen gaseous compound which reacts readily with alkaline solution, then reacting the nitrogen-oxygen compound with an alkaline solution in a wet scrubbing operation to produce a nitrite salt, and then oxidizing the nitrite salt to convert said nitrite salt into a nitrate salt.

11. The method of removing nitrogen dioxide from gas comprising reacting the nitrogen dioxide in the gas with sulfurous acid in a wet scrubbing operation to convert the nitrogen dioxide into a compound which reacts readily with alkaline solution, then reacting the said compound with an alkaline solution in a wet scrubbing operation to produce a nitrite salt, and then oxidizing the nitrite salt to convert said nitrite salt into a nitrate salt.

12. The method of claim 11, wherein the reaction of the nitrogen dioxide with the sulfurous acid is carried out by countercurrent contacting the sulfurous acid and the gas containing the nitrogen dioxide.

13. The method of claim 11, wherein the sulfurous acid is produced by reacting water with sulfur dioxide and wherein sulfuric acid is produced in the reaction of the nitrogen dioxide and sulfurous acid and the concentration of the said sulfuric acid is monitored and controlled to prevent the sulfuric acid from reaching a high level at which it inhibits the reaction of the sulfur dioxide and the water.

14. The method of claim 13, wherein the liquid containing the sulfuric acid is drained off and replaced by water to prevent the sulfuric acid concentration from reaching the high level.

15. The method of claim 13, wherein the solution capacity for sulfur dioxide of the liquid in which the nitrogen dioxides are reacted with the sulfurous acid in the wet scrubbing operation is monitored by measuring the oxidation-reduction potential of the liquid and the concentration of sulfuric acid is monitored by measuring the pH of the liquid.

* * * * *